United States Patent [19]
Bitter et al.

[11] Patent Number: 5,143,613
[45] Date of Patent: Sep. 1, 1992

[54] COUNTER-CURRENT MEMBRANE MODULE FOR LIQUID SEPARATION

[75] Inventors: Johan G. A. Bitter, Amsterdam; Harry Futselaar; Imre G. Racz, both of Enschede, all of Netherlands

[73] Assignee: Shell Oil Company, Houston, Tex.

[21] Appl. No.: 722,433

[22] Filed: Jun. 27, 1991

[30] Foreign Application Priority Data

Jul. 3, 1990 [NL] Netherlands ............ 9001514

[51] Int. Cl.⁵ .................................. B01D 63/00
[52] U.S. Cl. ..................... 210/321.8; 210/321.89; 210/500.23
[58] Field of Search ............ 210/195.2, 321.6, 321.72, 210/321.78, 321.79, 321.8, 321.87, 321.88, 321.89, 500.23

[56] References Cited

U.S. PATENT DOCUMENTS 4,082,670  4/1978  Joh ............................. 210/195.2

FOREIGN PATENT DOCUMENTS 837414    3/1970   Canada .
0374873   6/1990   European Pat. Off. .
2650341   5/1978   Fed. Rep. of Germany .
2222134  10/1974   France .
87/06151 10/1987   PCT Int'l Appl. .

OTHER PUBLICATIONS

Abstract of Japan; vol. 5; No. 49; 8.4–91, Apr. '81.

Primary Examiner—Frank Sever

[57] ABSTRACT

A counter-current flow membrane module for liquid separations consisting of a body comprising hollow fiber membranes wherein the hollow fiber membranes are arranged transversely of the longitudinal axis of the module and the channels in the hollow fibers are connected to spaces present around the body which is furthermore surrounded by a shell. The module comprises two or more transverse current flow (cross-flow) segments formed by seals between the body and the shell, wherein at least one fiber layer or fiber fabric is applied per segment.

20 Claims, 1 Drawing Sheet

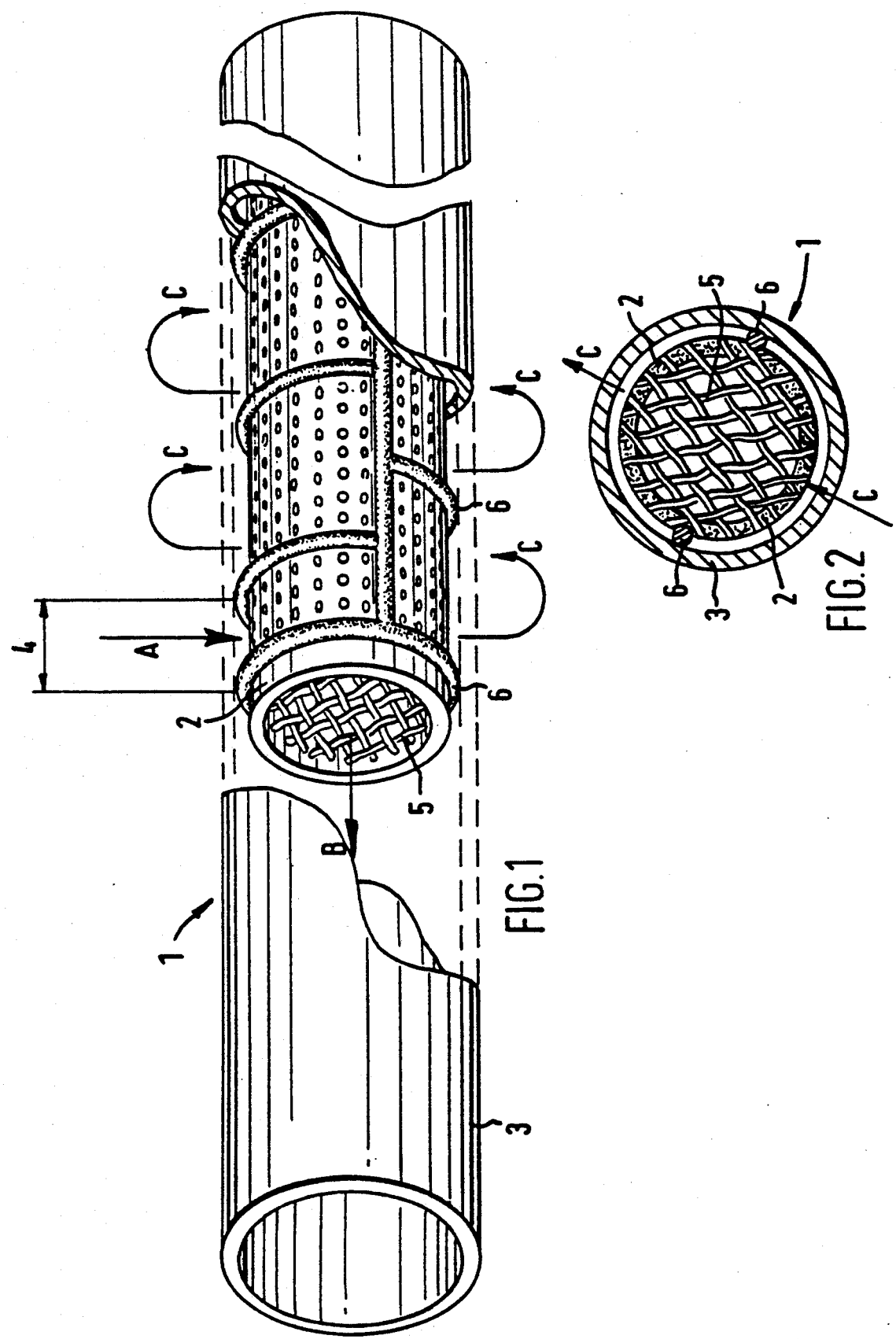

ately not very suitable because of the high osmotic pressure difference between feed and permeate then occurring, due to which the effective pressure difference—the motive force behind permeate production—decreases so that, for achieving a certain level of production, capital expenditure as well as operating costs rise sharply.

COUNTER-CURRENT MEMBRANE MODULE FOR LIQUID SEPARATION

BACKGROUND OF THE INVENTION

1. Field of the Invention

The invention relates to a counter-current membrane module for liquid separations.

2. Description of the Prior Art

Separation processes are frequently used in the process industry, either as such or in combination with a subsequent or previous physical/chemical/biological treatment.

Membrane filtration processes can be an alternative for other separation processes, for example distillation, in particular in those cases where small differences in vapor pressure or azeotropic mixtures are present, or in separations in which one of the components is present in small quantities and has a higher boiling point than the other components.

For separating components in one liquid phase, reverse osmosis—hyperfiltration—can be used in many cases. For achieving high differences in concentration between feed and permeate, however, the usual "single-stage" processes are technically and economically not very suitable because of the high osmotic pressure difference between feed and permeate then occurring, due to which the effective pressure difference—the motive force behind permeate production—decreases so that, for achieving a certain level of production, capital expenditure as well as operating costs rise sharply.

Multistage installations are known in which the permeate from one process step is again repressurized in the following process step (cascade arrangement). This enables a good separation to be achieved, but at the expense of much higher energy consumption required for repeatedly repressurizing feed streams.

Counter-current membrane systems in which feed and permeate are consequently arranged running counter to each other are known as "Membrane rectification column", "Counter current reverse osmosis membrane column" (CCRO) and "Continuous" or "Reflux membrane column". Such an arrangement is known for gas separation, pervaporation and liquid separations, while a number of other uses such as concentrating organic substances from aqueous solutions and purification of waste water are also known.

Furthermore, a liquid-liquid separation in a reflux membrane column is known, whereby the operation of such a principle is experimentally demonstrated for an ethanol/water system.

Although it has been clearly recognized that, in the case of liquid-liquid separations in which high osmotic pressure differentials can occur, a counter-current arrangement might be superior to the available single-stage embodiment, their implementation has hardly been started. The advantage of counter-current would appear in particular on concentrating diluted solutions such as ethanol/water mixtures which are obtained, for example, by fermentation. Economic evaluations show that, on concentrating a 5% ethanol solution by means of a counter-current process, capital expenditure and energy costs can be reduced by a factor of at least two as compared to a single-stage process.

Consequently, there is a requirement for a counter-current membrane module in which a local transverse current is combined in one module with a general counter current, in order to achieve a higher mass transfer and less fouling.

The invention accordingly provides a counter-current membrane module for liquid separations consisting of a body comprising hollow fiber membranes in which the hollow fiber membranes are arranged perpendicularly to the longitudinal axis of the module and the channels in the hollow fibers are connected to a space present around the body which is furthermore surrounded by a shell, characterized in that the module comprises two or more transverse-current segments formed by seals between the body and the shell, wherein at least one fiber layer or fiber mat per segment has been placed.

In an advantageous embodiment of the invention the body and the shell are longitudinal. Furthermore the hollow fiber membranes can be incorporated in a fabric or mat.

By making feed and permeate flow in a general counter current and locally in a transverse current, an optimization of the motive force behind the separation process is achieved.

For reverse osmosis, for example, this means that the concentration difference across the membrane and, consequently, osmotic pressure differential, is kept to a minimum so that the effective pressure differential is a maximum. For dialysis, on the other hand, this achieves a maximum concentration gradient across the membrane and, consequently, a maximum motive force.

The invention is based in particular on mounting devices in the module for implementing transverse as well as counter currents.

The invention will now be explained in more detail with reference to the drawings and the description as follows.

BRIEF DESCRIPTION OF THE DRAWINGS

FIG. 1 shows a cut-away view of a counter-current module according to the invention, and FIG. 2 shows a view in axial direction.

DETAILED DESCRIPTION OF THE INVENTION

With reference to FIG. 1, a counter-current module 1 is shown, comprising a body 2, which can, for example, be longitudinal, and a shell 3. The body 2 is, for example, tube-shaped and molded from resin, and the shell 3 can, for example, be made of metal.

Furthermore, the module is built up from at least two transverse-current segments. One segment is marked by reference number 4. The segments are formed by seals 6 between the body 2 and the shell 3.

The number of segments is at least two, because with a smaller number of segments (one) no counter-current, but only a transverse current can be realized. The number of (transverse-current) segments is in principle not limited to a maximum.

At least one hollow fiber layer 5 (or fiber mat) is laid per each transverse-current segment. This can be done by any suitable manner.

The number of fiber layers per transverse-current segment is not limited to a maximum, but depends on the given process requirements. Subsequent transverse-current segments can also comprise varying numbers of fiber layers, according to the increase or decrease in the feed and permeate streams.

Arrows A, B and C in FIG. 1 represent permeate, retentate and local transverse currents, respectively.

Fibers can be placed in any suitable manner, for example, horizontally, perpendicularly, crosswise or randomly. Similarly placing the fiber layer in the axial plane can be carried out in any suitable manner, for example perpendicularly or obliquely.

As already pointed out hereinbefore, a module is built up of segments. The dimensions of the module are determined as follows:

A general counter-current module comprises a minimum of two segments. The (center line to center line) distance between the fibers will in general be chosen between 1.5 and 2.5 times fiber diameter, namely as small as possible, in order to achieve the greatest possible surface area, but not so small that flow rate and thus the pressure drop in longitudinal direction of the module becomes very high.

For a given module diameter, the liquid throughput is determined by means of the relationship:

$$\exp(-J/k) > 0.90 \quad (1)$$

wherein J is the flow and k the mass transfer coefficient at the shell side. The value of J follows from the membrane properties. Typical values of J are:
  for purposes of dialysis: 0.25 to 1 m$^3$/m$^2$/d
  for reverse osmosis: 0.1 to 0.5 m$^3$/m$^2$/d (at a pressure difference of 30 bar).

The value of k depends on the properties of the liquid, the geometry and the longitudinal flow velocity. The significance of relationship (1) is that resistance to mass transport is a function of the membrane and not the transfer in the liquid phase to the membrane ("concentration-polarization"). The mass transfer coefficient can be related to liquid velocity according to a relationship of the form:

$$Sh = K Re^a Sc^b \left(\frac{d}{l}\right)^c \quad (2)$$

where Sh is the Sherwood number, Re the Reynolds number, Sc the Schmidt number, K a constant, d the diameter and l the length. Sh is proportional to k and Re to liquid velocity. The values of a, b, c and K are usually determined experimentally.

From the given relationships a desired minimum value of liquid velocity can be calculated (in general a velocity of approx. 0.01 to 0.3 m/s at the surface will be found to be sufficient) and thus liquid throughput (retentate flow) through the module. The permeate stream can then be calculated from the process data and the membrane properties.

Relationship (1) can also be applied to the permeate side (the inside of the fibers) and thus the desired minimum value for permeate velocity can be calculated. For high values of J, furthermore, pressure drop across the fibers has to be monitored. In this case a lower velocity may be necessary. From permeate stream and flow rate through fibers then follows the total fiber surface area permeated (number of fiber $\times \pi/4 \times d^2$) and thus the number of fibers per segment.

FIG. 2 shows a view in axial direction of the module of the invention, wherein the same reference numbers as in FIG. 1 have been used.

The invention will also be explained in more detail with reference to a practical embodiment:

| | | |
|---|---|---|
| Outside diameter fiber: | ($d_u =$ ) | 2.0 mm |
| Inside diameter fiber: | ($d_i =$ ) | 1.6 mm |
| Distance between fibers: | ($s_q =$ ) | 5.24 mm (center to center) |
| Inside diameter module: | ($D_i =$ ) | 100 mm |
| Effective inside diameter: | ($l_{eff} =$ ) | 90 mm |
| Total fiber length per mat: | ($l_1 =$ ) | 1.5 m/mat |
| Number of fibers per mat: | ($n_1 =$ ) | 19 fibers/mat |
| Fiber surface area per mat: | ($A_1 =$ ) | 0.0094 m$^2$/mat. |

From the membrane properties and the process conditions follows the value of J, for example, $J = 0.94 \times 10^{-6}$ m/s and thus the minimum value of k: $0.94 \times 10^{-5}$ m/s; the value chosen is, for example, k: $= 1.88 \times 10^{-5}$ m/s. From a known mass transfer correlation there follows a corresponding longitudinal liquid flow velocity of: $v_{shell} = 0.020$ m/s (which also gives a pressure drop of 0.0014 bar/m) and thus a liquid throughput ($Q_{shell}$, retentate side) of $1.57 \times 10^{-4}$ m$^3$/s (or 13.6 m$^3$/d) per module. From process calculations follows an associated permeate stream ($Q_{tube}$) of $1.04 \times 10^{-4}$ m$^3$/s.

For the permeate side (inside), correcting for the differences between exterior and inside surface area of the fibers the following is obtained: $k_{tube} = J/0.10 \times d_u/d_i = 1.18 \times 10^{-5}$ m/s. With a known mass transfer correlation, this gives: $v_{tube} = 0.055$ m/s (and also a pressure drop of $6.2 \times 10^{-4}$ bar/segment). From permeate stream and fiber velocity, the permeated surface area on the permeate side is now calculated: $1.89 \times 10^{-3}$ m$^2$, and thus 940 fibers are required per segment, corresponding to 49 mats.

The total number of segments follows from the quotient of the total required fiber surface area per segment.

It will be clear to a person skilled in the art that any suitable number of fibers per segment can be used and therefore any suitable number of mats per segment, dependent on the membrane properties and process conditions.

In advantageous embodiments of the invention, the surface areas of the segments range from 5 mm$^2$ to 10 m$^2$, while seal thickness is between 1 to 10 mm.

What is claimed is:

1. A counter-current membrane module for liquid separations comprising:
    a hollow shell;
    a countercurrent membrane module enclosed by said shell;
    means for providing a local transverse current of sufficient magnitude to provide substantially higher mass transfer and substantially less fouling, with a general countercurrent, including, a plurality of seals located between said shell and said membrane module for defining a plurality of spaces between said shell and said membrane module, said spaces defining at least first and second segments transversely of said membrane module for providing a path for current flow from one side of said first segment, through said first segment to the opposite side of said membrane module, thence reversing said current flow through said second segment and back through said membrane module; and
    at least one fiber mat located in each of said segments, said fiber mats comprising hollow fiber membranes arranged such that the channels of said hollow fiber membranes extend through the wall of said membrane module and connect to the spaces between said shell and said membrane module.

2. The module as claimed in claim 1, wherein the distance between the fibers of one fiber mat (measured from center line to center line) is equal to between 1.5 and 2.5 times fiber diameter.

3. The module as claimed in claim 2, wherein subsequent segments comprise varying numbers of mats.

4. The module as claimed in claim 2, wherein subsequent segments comprise the same number of mats.

5. The module as claimed in claim 2, wherein the fibers in the fiber mat are placed horizontally.

6. The module as claimed in claim 2, wherein the fibers in the fiber mat are placed perpendicularly.

7. The module as claimed in claim 2, wherein the fibers in the fiber mat are placed crosswise.

8. The module as claimed in claim 2, wherein the fibers in the fiber mat are placed at random.

9. The module as claimed in claim 2, wherein the fiber layers in the axial plane are placed perpendicularly.

10. The module as claimed in claim 1, wherein subsequent segments comprise varying numbers of mats.

11. The module as claimed in claim 1, wherein subsequent segments comprise the same number of mats.

12. The module as claimed in claim 1, wherein the fibers in the fiber mat are placed horizontally.

13. The module as claimed in claim 1, wherein the fibers in the fiber mat are placed perpendicularly.

14. The module as claimed in claim 1, wherein the fibers in the fiber mat are placed crosswise.

15. The module as claimed in claim 1, wherein the fibers in the fiber mat are placed at random.

16. The module as claimed in claim 1, wherein the fiber layers in the axial plane are placed perpendicularly.

17. The module as claimed in claim 1, wherein the fiber layers in the axial plane are placed obliquely.

18. The module as claimed in claim 1, wherein the surface areas of the segments are between 5 $mm^2$ and 10 $m^2$.

19. The module as claimed in claim 1, wherein the seals have a thickness of 1 to 10 mm.

20. The module as claimed in claim 1, wherein the body and shell are longitudinal.

* * * * *